United States Patent [19]
Elias et al.

[11] Patent Number: 5,660,737
[45] Date of Patent: Aug. 26, 1997

[54] PROCESS FOR MAKING A CAPACITOR FOIL WITH ENHANCED SURFACE AREA

[75] Inventors: William H. Elias, Six Mile, S.C.; Thomas F. Strange, Hampton Cove, Ala.; James I. Stevens, Irmo, S.C.

[73] Assignee: Ventritex, Inc., Sunnyvale, Calif.

[21] Appl. No.: 443,134

[22] Filed: May 17, 1995

[51] Int. Cl.$^6$ .................................. B44C 1/22; C23F 1/00
[52] U.S. Cl. .................................. 216/6; 216/33; 216/47
[58] Field of Search .......................... 216/6, 33, 41, 216/47, 102, 91; 437/919; 148/DIG. 14; 361/523

[56] References Cited

U.S. PATENT DOCUMENTS

| | | | |
|---|---|---|---|
| 2,607,825 | 8/1952 | Eisler | 216/6 |
| 3,365,378 | 1/1968 | Maissel et al. | 216/6 |
| 3,819,340 | 6/1974 | Heier et al. | 29/570 |
| 4,254,775 | 3/1981 | Langer | 128/419 |
| 4,385,342 | 5/1983 | Puppolo et al. | 361/433 |
| 4,470,885 | 9/1984 | Randall, Jr. et al. | 204/29 |
| 4,537,665 | 8/1985 | Nguyen et al. | 204/29 |
| 4,827,381 | 5/1989 | Brommer et al. | 361/531 |
| 4,881,151 | 11/1989 | Weekamp et al. | 361/531 |
| 4,942,501 | 7/1990 | MacFarlane et al. | 361/523 |
| 5,131,388 | 7/1992 | Pless et al. | 128/419 |

OTHER PUBLICATIONS

"Implantable Cardioverters and Defibrillators", Troup, Current Problems in Cardiology, Dec. 1989, pp. 704–713.

*Primary Examiner*—William Powell
*Attorney, Agent, or Firm*—Steven M. Mitchell; Mark J. Meltzer

[57] ABSTRACT

An improved electrolytic capacitor is provided by producing an anode foil which has areas which are not subject to stress during manufacturing being highly etched and those areas which are subject to stress during manufacturing being lightly etched or not etched at all. The process of the invention provides an etch mask to cover during the etch process those portions of the anode foil which will be subjected to stress during construction of the capacitor. The highly etched areas, which are very brittle, provide increased capacitance and thus improved energy density. For layered or stacked capacitors, a weld tab is covered with the etch mask to allow connection of the anode layers. Additionally, strong edges may be maintained thereby reducing the possibility of cracking that would normally occur during the stamping and assembly operations. For flat or oval capacitors made by rolling or winding the capacitor element on a large arbor, and then flattening the element by compressing it in a press, high stress occurs at the sharp bends resulting in cracking or breaking if the foil is not flexible. The method of the invention allows high gain foil to be used in the flat areas, while masking strengthens the locations where the sharp bends occur, thereby improving the capacitance.

14 Claims, 3 Drawing Sheets

PROCESS FOR MAKING A CAPACITOR FOIL WITH ENHANCED SURFACE AREA

FIELD OF THE INVENTION

The present invention relates generally to aluminum electrolytic capacitors, and more specifically to an improved highly etched and brittle capacitor foil.

BACKGROUND OF THE INVENTION

High-voltage capacitors are useful in technology applications where brief high-voltage pulses must be delivered, for example, in automatic implantable cardioverter/ defibrillators ("ICDs") where high-voltage pulses are required across the defibrillation lead system to effect defibrillation or cardioversion. An ICD and package therefor, including rolled (or "wound") capacitors, are described in U.S. Pat. No. 4,254,775 to Langer.

Implantable defibrillators are implanted in patients suffering from potentially lethal cardiac arrhythmias. The device monitors cardiac activity and decides whether electrical therapy is required. If a tachycardia is detected, pacing or cardioversion therapy may be used to terminate the arrhythmia. If fibrillation is detected, defibrillation is the only effective therapy.

Both cardioversion and defibrillation require that a high voltage shock be delivered to the heart. Since it is impractical to maintain high voltage continuously ready for use, implantable defibrillators charge energy storage capacitors after detection of an arrhythmia and prior to delivering a shock to the heart.

In implantable defibrillators, as in other applications where space is a critical design element, it is desirable to use capacitors with the greatest possible capacitance per unit volume. One way to increase capacitance per unit area in a flat capacitor is to etch the surface of the anode foil perpendicular to the surface thereof. An implantable cardiac defibrillator with improved flat capacitors is described in U.S. Pat. No. 5,131,388 to Pless et al., which incorporated herein by reference.

Background art describing details of construction of traditional high voltage capacitors used in automatic defibrillators are described by P. J. Troup, "Implantable Cardioverters and Defibrillators," at pp. 704–713 (*Current Problems in Cardiology*, Vol. XIV, No. 12, December 1989, Year Book Medical Publishers, Chicago), which pages are incorporated herein by reference.

Typically, electrolytic capacitors are used in these applications because they have the most ideal properties in terms of size and ability to withstand relatively high voltage. Aluminum electrolytic capacitors are generally used, having aluminum foil plates rolled into a very small volume. By etching the surface of the aluminum foil, the surface area can be further increased and the capacitance increases accordingly.

After the foil is etched, voltage is applied to the foil through an electrolyte such as boric acid and water or other solutions familiar to those skilled in the state of the art, resulting in the formation of aluminum oxide ($Al_2O_3$) on the surface of the anode foil. The thickness of aluminum oxide deposited or "formed" on the anode foil is proportional to the applied voltage, roughly 10 to 15 Angstroms per applied volt. The aluminum oxide layer formed on the foil causes the foil to become brittle. In addition, the brittleness of the foil and its capacitance are both proportional to the depth of the etching and the density of the etch pits, i.e., the number per unit area. Accordingly, the capacitance and thereby the energy density are limited by the brittleness of the formed foil.

Another difficulty with using a highly etched anode foil is experienced when the foil is used in a multi-layer flat capacitor such as the one described in Pless et al. If the anode foils are to be electrically connected together by welding, difficulty is experienced because there is insufficient aluminum present for the weld and, if the forming step is performed prior to assembly of the stack and joining of the anode layers, too much aluminum oxide is present for a reliable weld.

The maximum rated voltage of available single electrolytic capacitors has been in the range of 450 V, in which approximately 3 joules can be stored per cubic centimeter of capacitor volume. As noted by Dr. P. J. Troup, (above), this makes the capacitor "probably the single largest limitation to further miniaturization of implantable defibrillators" given current energy delivery requirements.

The maximum high voltage and energy needed for an implantable defibrillator is in the range of 750 V and 40 joules. This necessitates the use of two capacitors coupled in series. Since each capacitor must store approximately 20 joules, their size is relatively large, and it is difficult to package them in a small implantable device. Currently available implantable defibrillators are relatively large (over 10 cubic inches), generally rectangular devices about an inch thick. The patient who has a device implanted may be bothered by the presence of the large object in the abdomen. For patient comfort, it is desirable to minimize the size of the defibrillators. As noted by Troup, the size of the capacitors has been a critical factor contributing to the size of the defibrillator. A further advantage of reducing the size of the defibrillator is that a smaller device can be implanted in the pectoral region of the patient and the defibrillator case may be used as a defibrillation electrode.

It is therefore an object of the present invention to provide a capacitor that can store a higher amount of energy per unit volume.

It is another object of the invention to provide a method of making a capacitor foil having a portion of its surface which is etched to a high degree.

It is still another object of the invention to provide an anode foil for a stacked capacitor which can be easily welded to other anode foils in the stack.

SUMMARY OF THE INVENTION

The instant invention is directed to the benefits obtained by deep etching of the anode foil for aluminum electrolytic capacitors. Anode foil is not normally etched to this degree because such an etch leaves the foil so brittle that it cannot be wound into capacitors without breaking or cracking the foil and anode foils of flat stacked capacitors are difficult to join together. By deeply etching the anode foil to this degree one can produce 30% to 50% more capacitance than with foil that is not deep etched. The invention provides a way to deep etch the anode foil for the advantages of high capacitance while leaving strategic regions of high flexibility.

The first capacitor type to benefit from the process of the invention is a stacked capacitor where anode plates are stamped from high gain capacitor foil and are then stacked into a capacitor element without bending the brittle plates. Each anode plate must have an electrical connection to the anode terminal. Joining of the anode plates at a weld tab on each plate is made possible by masking the area where this tab is to be attached during the etch process to provide a region of high strength so that the plates may be electrically joined and also connected to the anode terminal by welding. Flexibility in the tab region also allows the tabs of, for example, the upper and lower anode foils in a stack to be bent together for welding. Such a construction also may benefit from masking the periphery of the plate so that strong edges are maintained when the plate is stamped or die cut and thereby reducing the possibility of cracking that would normally occur during the stamping and assembly operations.

The second capacitor type to benefit from the process of the invention is a flat or oval capacitor that is made by rolling or winding the capacitor element on a large arbor, and then flattening the element by compressing it in a press. When flattening a capacitor element of this shape, having a cross section similar to a doughnut, the material will flatten with a bend at each side and will have flat areas in between. High mechanical stress occurs at the sharp bends resulting in cracking or breaking if the foil is not flexible. Normally such a structure must use low gain foil that will flex and not break at the high stress points. The method of the invention allows high gain foil to be used in the flat areas, while masking strengthens the locations where the sharp bends occur, thereby improving the capacitance.

The process of the invention provides an etch mask, preferably of phenolic plastic, to cover during the etch process those portions of the anode foil which will be subjected to stress during construction of the capacitor, such as the weld tabs and edges of a layered capacitor and the bends of a flattened annular capacitor. Complimentary masks are placed over both foil surfaces prior to etching the anode foil. The etch masks are preferably held to the surface of the foil with a frame. The assembly is immersed in an etch bath, typically of chloride ions and water. A current is passed between etch plates and the foil until the exposed foil surfaces facing the etch plates are highly etched. The portions of the foil covered by the etch masks are not etched or preferably are etched to a lesser degree. Some etching may be desirable because this can contribute to the foil capacitance without making the foil too brittle for handling or capacitor construction. After the etching step, the masks are removed and the foil is cleaned and subjected to a forming process in an electrolyte such as a boric acid solution. The foil may then be stacked into a flat layered capacitor with separator layers and cathode plates or rolled into an annular capacitor with separator layers and a cathode foil layer. The annular capacitor is flattened, i.e. pressed from two sides so that it becomes oval or almost rectangular in cross-section, with the anode foil positioned such that the portions which are more flexible because they are not etched, or are etched to a lesser degree, are located at the bends of the flattened annulus.

The method and capacitor of the instant invention, by solving the problem of foil breakage or cracking upon winding when the foil is deeply etched and highly formed, combine the advantages of deep etching and resulting high capacitance for the anode foil and the advantages associated with wound capacitors. It also allows for improved capacitors using the stacked construction by providing plates with stronger edges and stronger tabs for electrical connections, both of which improve the reliability of the stacked capacitor.

BRIEF DESCRIPTION OF THE DRAWINGS

The various features and advantages of the present invention may be more readily understood with reference to the following detailed description taken in conjunction with the accompanying drawings in which.

DETAILED DESCRIPTION OF THE INVENTION

Figure 1:
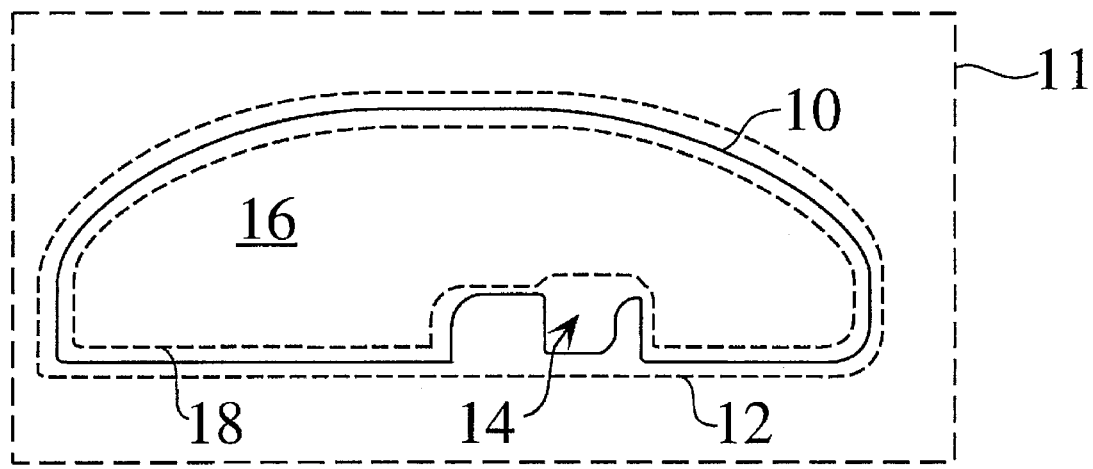
FIG. 1 is a plan view of an anode foil illustrating a weld tab and foil periphery which have been masked in accordance with the invention.

Referring now to FIG. 1, a plan view of an anode plate for a flat layered capacitor is shown. In the preferred embodiment, an aluminum anode foil or plate 10 is about 2 to 10 mils thick. The foil 10 is covered by an etch mask 12 on each side (shown in phantom lines) made from a sheet of phenolic plastic which is about 0.25 inches thick. A number of plates can be cut from a single sheet 11 of high purity aluminum (shown in phantom lines) so that a number of anode foils are etched at the same time. The figure shows only a single anode foil to be cut from sheet 11 for illustration purposes. Each anode foil 10 includes a weld tab 14 which is masked on both sides of the foil. FIG. 1 shows only a part of the mask sheet 12 which extends to cover the weld tab and periphery of each of the anode foils to be cut from the sheet 11. In an equally preferred embodiment of the invention, only the weld tabs 12 are masked. Where the mask 12 is used to cover the periphery of anode foil 10, it provides access to the exposed area 16 of the foil surface which is etched to a depth of from about 60 to 125 microns, resulting in a surface area enlargement greater than 20 times.

After the foil is etched and formed and the anode plates are stamped, an area 18 of the foil surface which is masked or protected from etching or which is relatively lightly etched with surface enlargement of less than 20 times remains. The portion 18 will remain relatively flexible and be less subject to breaking or cracking in response to stress from stamping or bending of the foil during the capacitor manufacturing process. A "root" of the weld tab 14 will remain flexible to allow for bending. The anode foil 10 shown in FIG. 1 is configured to conform to a defibrillator housing, however, any other desired shape could be used.

Figure 2:
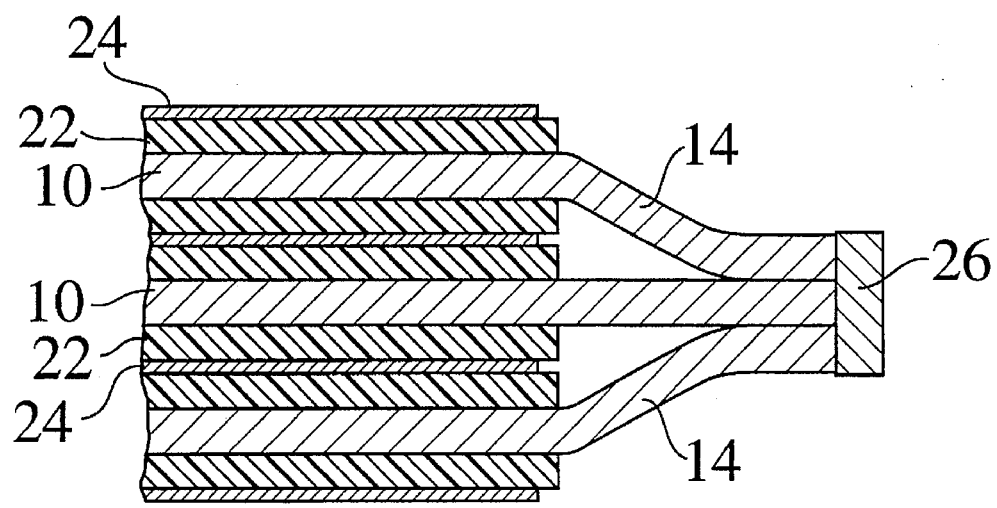
FIG. 2 is a partial cross sectional view of an assembled flat capacitor stack illustrating a feature of the invention.

FIG. 2 shows a cross-sectional view of a portion of a stacked flat capacitor including the weld tabs 14. Each anode foil 10 of the stack has been etched and masked on both sides. Each capacitor anode layer may consist of a single anode plate, double anode plates, or a higher multiple of anode plates. Each configuration will give a different energy density and different ESR. ESR is the capacitor series resistance which should be as low as possible or at least matched to the application. Energy density gets better as the number of anode plates per layer increases, but ESR gets worse. The actual number of anode plates per layer will therefore be a compromise between a lower energy density and an acceptable ESR, with two anode plates in common use for these and similar applications. Paper separators 22 cover each anode layer and separate the anode layer from a cathode foil 24. Only three layers of anode foil have been shown for illustrative purposes but the actual number of layers used will be a function of the desired capacitance of the finished capacitor. The upper and lower weld tabs 14 are shown bending toward the center tab. A riser 26 of high purity aluminum is placed at the ends of the tabs and joined perpendicular to them. Two laser welds are made along the face of the tabs at each side of the riser joining the plates as well as connecting them to the riser. The riser will be connected to an anode terminal when the plates are assembled in a capacitor housing. Cathode plates 24 have similar tabs that are joined together and welded directly to the case by ultrasonic welding. The cathode foil is inherently flexible and does not require masking.

Figure 3:
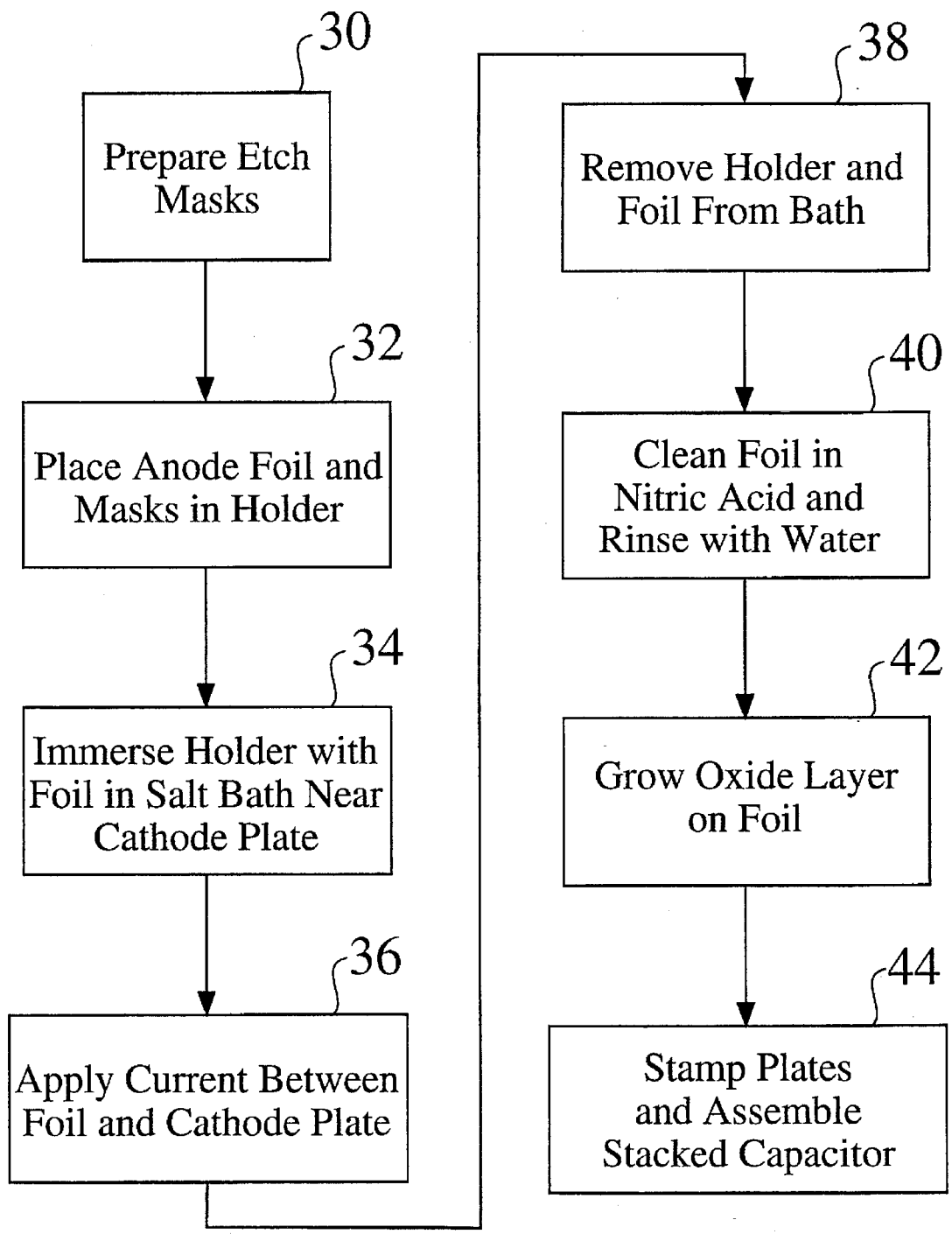
FIG. 3 is a process diagram illustrating the steps of the invention in producing an improved capacitor.

Referring now to FIG. 3, in conjunction with FIG. 1, the process for producing an improved anode foil and a capacitor using such foil will be discussed. The etch masks 12 are prepared with the desired shapes at step 30. In the case of a layered capacitor, complimentary masks are made for the opposing faces of aluminum sheet 11. The same masks or mask shapes can be used for each layer. For a flattened annular capacitor, a long continuous mask is made having an increasing mask strip width along with increased spacing as will be discussed below. This is necessary because the perimeter of the rolled capacitor bends increases with each rolled layer. It is a matter of simple geometry to determine the exact spacing.

At step 32, an insulating clamp or holder (not shown), preferably of phenolic plastic, holds the masks 12 flat and straight on the surface areas 18 of the foil 10 including the weld tabs and anode foil periphery if desired.

Once the sheet 11 is positioned in the holder with the masks 12 in place, the assembly is lowered into an etch bath of about 10 to 20% aqueous NaCl or similar solutions known to those skilled in the art at step 34. One or more cathode plates are positioned about 2 to 3 inches from the foil surface. A current of about 0.1 to 0.5 amps/cm$^2$ is then applied between the foil and the cathode plate(s) for one to five minutes at step 36. This provides the deep etch normal to the foil surface in the areas of the foil not covered by the mask. There may be a certain amount of etching which occurs under the mask, particularly along the edges of the mask where undercutting may occur. This is not a problem as long as the etch is not too deep since the foil can be etched some and retain the needed flexibility. Some etch of the covered surface 18 of the foil 10 may be desirable since this will increase the capacitance without unduly impairing the flexibility of this area of the foil.

Next, at step 38, the assembly with the foil and masks is removed from the etch bath. Then the foil is cleaned in nitric or similar acid and rinsed with water at step 40. The anode sheet 11 is now ready for forming which involves growing an oxide layer on the etched surface at step 42. This is typically done by applying a voltage to the foil through an electrolyte such as boric acid and water or other solutions familiar to those skilled in the art, resulting in the formation of aluminum oxide ($Al_2O_3$) on the surface of the anode foil 10. The thickness of aluminum oxide deposited or "formed" on the anode foil is proportional to the applied voltage, roughly 10 to 15 Angstroms per applied volt. As shown at step 44, anode plates may be stamped from the formed foil. These anode plates are assembled with cathode plates and separators into a stacked or layered capacitor assembly which is then placed in an aluminum capacitor case into which an electrolyte is injected. Alternatively, the formed foil may impregnated with an electrolyte and the stack encapsulated in a polymeric envelope with cathode and anode feedthroughs extending through the envelope. The assembly may be of the type described in the Pless et al. patent or a modification of that design.

Some steps of the invention may be performed at different stages without departing form the scope of the invention. For example, the forming step may be performed after the capacitor stack is assembled into a housing. Further, the electrolyte may be added after the capacitor stack is assembled in a housing.

Figure 4:
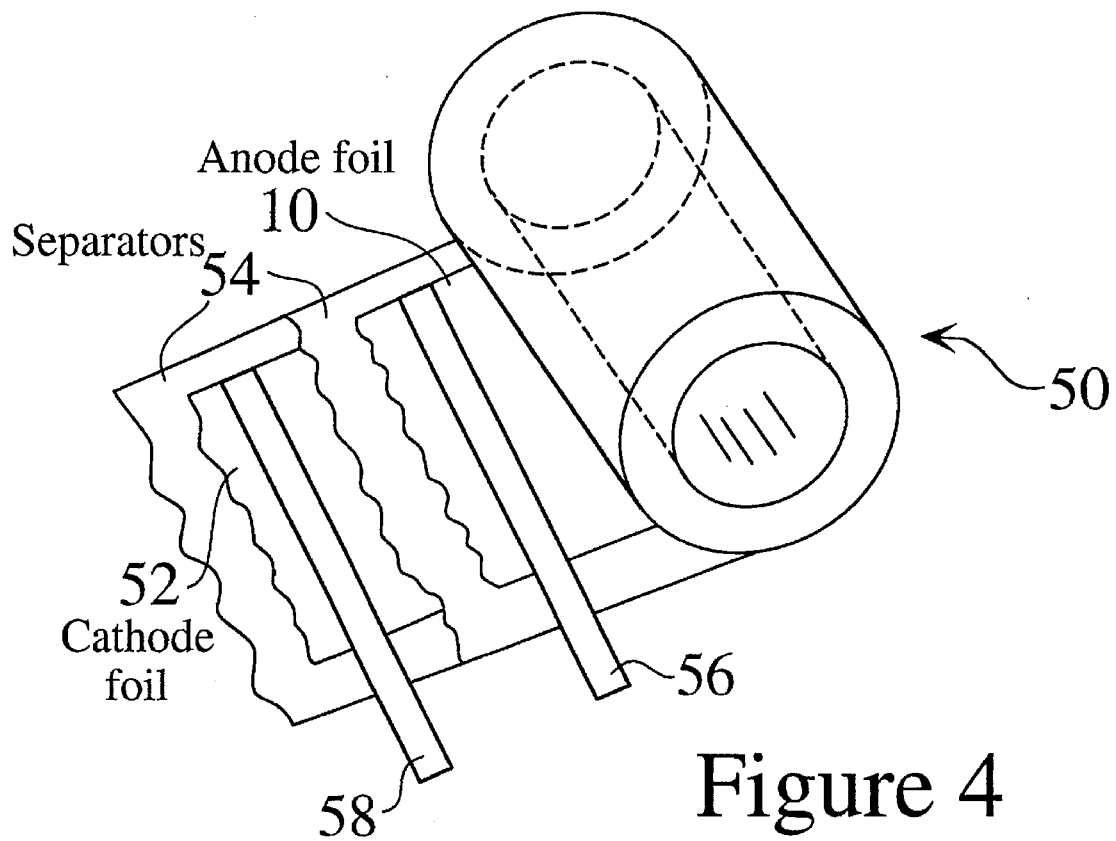
FIG. 4 shows a rolled annular capacitor partially unrolled to show the various layers.

FIG. 4 shows a rolled annular capacitor 50, partially unrolled, prior to its being flattened to provide a flat or oval capacitor. The anode foil 10, cathode foil 52 and paper separators 54 are rolled or wound on a large arbor, and then the cylindrical assembly having an open central core is flattened by compressing it in a press. An anode tab 56 is connected to the anode foil at an area of the foil which has been masked and a cathode tab 58 is connected to the cathode foil to provide electrical connection to the plates of the finished capacitor.

Figure 5:
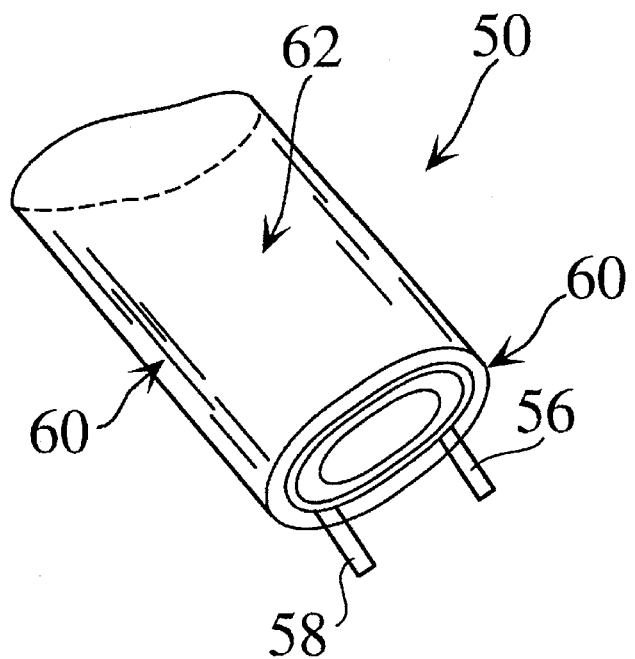
FIG. 5 illustrates a flattened annular capacitor manufactured in accordance with the invention.

A flattened oval capacitor is shown in FIG. 5. The material of the capacitor will flatten with a bend 60 at each side and flat areas 62 in between. High stress occurs at the sharp bends 60 resulting in cracking or breaking of the anode foil 10 if it is not flexible. The method of the invention allows high gain foil to be used in the flat areas, while masking strengthens the locations where the sharp bends occur, thereby improving the capacitance. The masked regions where the bends will occur will be spaced by an increasing amount from the inner portion of the roll to the outer portion and/or the masked regions will have increasing width to account for the increasing diameter of the cylinder.

It should be understood that various alternatives to the embodiments of the invention described herein may be employed in practicing the invention. It is thus intended that the following claims define the scope of the invention and that structures and methods within the scope of these claims and their equivalents be covered thereby.

What is claimed is:

1. A process for making an anode foil for use in an electrolytic capacitor comprising the steps of:

providing a thin metallic foil having first and second surfaces;

providing a first insulative mask shaped to cover a portion of said first surface of said foil;

assembling said first mask on said first surface of said foil such that said mask covers said portion of said first foil surface and exposes another portion of said first foil surface; and etching the exposed portion of said first surface to provide an etched foil first surface having an increased surface area.

2. A process for making an anode foil for use in an electrolytic capacitor comprising the steps of:

providing a thin metallic foil having first and second surfaces;

providing a first insulative mask shaped to cover a portion of said first surface of said foil;

providing a second insulative mask shaped to cover a portion of said second surface of said foil corresponding to said portion of said first surface covered by said first mask;

assembling said first mask on said first surface of said foil such that said mask covers said portion of said first foil surface and exposes another portion of said first foil surface;

assembling said second mask on said second surface of said foil; and etching the exposed portions of said first and second surfaces.

3. The process of claim 2 wherein said etching step includes the step of immersing the assembly of said masks and said foil in an etch bath.

4. The process of claim 2 wherein said step of assembling includes the step of clamping said masks on said surfaces of said foil with a frame.

5. A process of making an electrolytic capacitor comprising the steps of:

preparing an anode foil by etching a portion of each major surface of said foil;

growing an oxide layer on each etched portion of said anode foil;

providing an insulating separator and a cathode foil; and assembling said separator between one surface of said anode foil and said cathode foil; and impregnating said oxide layers with an electrolyte.

6. The method of claim 5 wherein said step of preparing said anode foil includes the step of preparing first and second insulative masks shaped to expose a portion each surface of said foil to be etched and cover the remaining portions of said foil surfaces and assembling said masks on said surfaces of said foil.

7. The method of claim 5 and further including the step of encapsulating the assembly of said cathode, anode and separator in a polymeric material.

8. The method of claim 5 and further including the step of enclosing the assembly of said cathode, anode and separator in a housing.

9. A method of making an oval capacitor comprising the steps of:

preparing an anode foil having a length substantially longer than its width and including a plurality of generally rectangular areas on one foil surface which are highly etched and a plurality of flexible strip areas perpendicular to the longitudinal extent of said anode foil separating said highly etched areas;

forming an oxide layer on the etched portions of said anode foil;

providing first and second insulating layers and a metal cathode foil each having a size and shape similar to that of said anode foil with said insulating layers being wider and longer than said anode and cathode layers;

assembling in sequential layers said first insulating layer, said cathode foil, said second insulating layer and said anode foil;

rolling said layers around an arbor to form a cylindrical capacitor having an open central core; and flattening said cylindrical capacitor by pressing it on opposite sides such that two flat areas are formed connected by two bent or curved sides wherein said highly etched areas of said anode foil are located within said flat areas and said strips which are lightly or not etched are located within said bent sides.

10. The method of claim 9 wherein said step of preparing said anode foil includes the steps of:

preparing first and second insulative etch masks with cutouts shaped to expose said generally rectangular areas of said foil surfaces and to cover said strips of said foil surfaces;

covering said foil surfaces with said masks and immersing said anode foil in an etch bath; and etching said surfaces of said anode foil.

11. A process of making an electrolytic capacitor comprising the steps of:

preparing a plurality of anode foils for use as anode layers by etching a portion of first and second surfaces of said foils and not etching other portions said of first and second surfaces;

growing an oxide layer on each etched portion of said anode foil;

providing a plurality of insulating separators and cathode foils with twice as many separators as anode layers and one more cathode foil than anode layers; and assembling said foils and separators in a sequence of cathode foil, separator, anode foil, separator, cathode foil, separator, anode foil, separator, and cathode foil; and impregnating said oxide layers with an electrolyte.

12. The method of claim 11 and further including the step of enclosing the assembly in a housing.

13. A process of making an electrolytic capacitor comprising the steps of:

preparing a plurality of anode foils for use as anode layers by etching a portion of first and second surfaces of said foils and etching to a lesser degree other portions said of first and second surfaces;

growing an oxide layer on each etched portion of said anode foil;

providing a plurality of insulating separators and cathode foils with twice as many separators as anode layers and one more cathode foil than anode layers; and assembling said foils and separators in a sequence of cathode foil, separator, anode foil, separator, cathode foil, separator, anode foil, separator, and cathode foil; and impregnating said oxide layers with an electrolyte.

14. The method of claim 13 and further including the step of enclosing the assembly in a housing.

* * * * *